United States Patent
Jacob et al.

(10) Patent No.: US 10,567,200 B2
(45) Date of Patent: Feb. 18, 2020

(54) METHOD AND APPARATUS TO REDUCE DELAYS IN CHANNEL ESTIMATION

(71) Applicant: NXP B.V., Eindhoven (NL)

(72) Inventors: Naveen Jacob, Bangalore (IN); Chaithanya Velampalli, Ongole (IN)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/277,066

(22) Filed: Feb. 15, 2019

(65) Prior Publication Data
US 2019/0268182 A1 Aug. 29, 2019

(30) Foreign Application Priority Data
Feb. 28, 2018 (EP) .................................... 18159195

(51) Int. Cl.
| H04B 1/16 | (2006.01) |
| H04L 25/02 | (2006.01) |
| H04B 1/06 | (2006.01) |

(52) U.S. Cl.
CPC .......... *H04L 25/0204* (2013.01); *H04B 1/06* (2013.01); *H04L 25/022* (2013.01); *H04L 25/0232* (2013.01); *H04L 25/0256* (2013.01); *H04L 25/025* (2013.01)

(58) Field of Classification Search
CPC ....... H04B 1/16; H04L 25/02; H04L 25/0202; H04L 25/022; H04L 25/024
See application file for complete search history.

(56) References Cited

U.S. PATENT DOCUMENTS

| 7,292,651 | B2 * | 11/2007 | Li ............................ H04L 1/06 370/252 |
| 7,817,738 | B2 * | 10/2010 | Takeuchi ............ H04L 27/2678 375/260 |
| 7,876,839 | B2 | 1/2011 | Dong et al. |
| 8,095,076 | B2 | 1/2012 | Aedudodla et al. |
| 9,313,002 | B1 * | 4/2016 | Balraj ................... H04L 5/0048 |
| 9,667,449 | B1 * | 5/2017 | Lu ........................ H04L 25/0226 |

(Continued)

FOREIGN PATENT DOCUMENTS

| CN | 101083644 A | * | 12/2007 |
| CN | 101478507 A | * | 7/2009 |

(Continued)

OTHER PUBLICATIONS

Ma, Y., "Research and Implementation of Channel Estimation of Digital Radio Receiver Based on OFDM", IEEE International Conference Neural Networks & Signal Processing, Jun. 8-10, 2008.

(Continued)

*Primary Examiner* — Blane J Jackson

(57) ABSTRACT

A signal processor and method of signal processing to reduce delays in channel estimation is described. In the method, the following operations are performed: receiving a signal at a signal processor (200); estimating a first channel from the received signal with a one-dimensional, 1D, frequency filter (304) in a frequency domain to generate an interim output; decoding said interim output (406) to generate decoded interim output; estimating (414,418) at least a second channel from the decoded interim output with a two-dimensional, 2D, filter (100) to produce a final output (420).

13 Claims, 4 Drawing Sheets

(56) References Cited

U.S. PATENT DOCUMENTS

2007/0110172 A1\* 5/2007 Faulkner ............. H04L 25/0242
　　　　　　　　　　　　　　　　　375/260
2009/0131123 A1\* 5/2009 Coersmeier .......... H04B 1/1036
　　　　　　　　　　　　　　　　　455/574

FOREIGN PATENT DOCUMENTS

| CN | 103685094 A | 3/2014 |
|---|---|---|
| EP | 1968268 A2 | 9/2008 |

OTHER PUBLICATIONS

Wang, J., "Irregular Low Density Parity Check Codes for Digital Radio Mondiale (DRM) Applications", Proceedings of 2004 International Symposium on Intelligent Multimedia, Video and Speech Processing, Oct. 20-22, 2004.

\* cited by examiner

Figure 1-prior art

METHOD AND APPARATUS TO REDUCE DELAYS IN CHANNEL ESTIMATION

CROSS-REFERENCE TO RELATED APPLICATIONS

This application claims the priority under 35 U.S.C. § 119 of European Patent application no. 18159195.9, filed on 28 Feb. 2018, the contents of which are incorporated by reference herein.

FIELD OF THE INVENTION

This invention relates to the field of signal processing to reduce the time taken for channel estimation. The invention is more particularly applicable to, but not limited to, radio broadcasts, in particular in relation to providing an improved time to audio (TTA) for the radio broadcast.

BACKGROUND OF THE INVENTION

Digital Radio Mondiale (DRM) is an international standard (used in India, Russia, South Africa, Brazil, etc.) for radio broadcasts at frequencies below 30 MHz as described in 'DRM: System Specification, ETSI ES 201 980 V4.1.1 (2014-01)'. In standard DRM systems, there are three channels, a Main Service Channel (MSC) that carries the multiplexed audio and data signals, a Service Description Channel (SDC) that carries information needed to decode the MSC, and a Fast Access Channel (FAC) that carries OFDM (orthogonal frequency division multiplexing) properties and configuration information for the SDC/MSC. As specified by the DRM standards, the FAC is always 4-QAM and therefore more immune to fading. Typically, DRM has four transmission modes; A, B, C and D. Mode A is used on medium and long wave frequencies using ground wave propagation for local broadcasts. Mode B is used for single-hop, short wave broadcasts and is commonly used in Europe. Mode C is used for long path multi-hop broadcasts on short wave, and mode D is used for Near Vertical Incidence Skywave (NVIS) broadcasts.

A standard radio receiver system has an antenna connected to a tuner for the reception of radio signals, and the output from the radio receiver is an audio signal and/or displayed information (text or picture). For known systems the received signals may be Amplitude Modulation (AM), Frequency Modulation (FM), or Digital signals. The received signals will be decoded by a combination of hardware circuits, hardware blocks and associated software modules for playing the audio and/or displaying the text information. A baseband processor (typically a Digital signal Processor) will contain software and specialized hardware to realize the baseband algorithms used in decoding the radio signal, and extracting the audio and/or text/picture information. A control processor (typically a host processor) will exercise all the control functionalities by performing the overall coordination for playing a radio station, such as:

Sending tune commands to the tuner, and validating the tuner reply to confirm tuning is operational.
Requesting the baseband processor to send periodic notifications on received signal quality, and associated parameters.
Forwarding the decoded radio signal to the control processor by the baseband processor for audio decoding.
Streaming the final decoded signal to a speaker or other output.

The memory and hardware circuits of the receiver work in conjunction with the processors or tuner for achieving the software realization of the modules and/or performing the functionality as specified by the hardware block.

Time to audio (TTA) is a well-known standard metric that is used to benchmark radio performance and is defined as the duration of time taken from the point at which the radio receives a radio signal/data to the time at which an audible signal is played at the speaker. Standards in this area will specify a minimum acceptable TTA.

Time-To-Audio (TTA) is typically comprised of the following parameters:
1. Tuner delay: This is well-known and generally does not need to be considered.
2. Inner receiver signal processing including signal detection, estimate of DRM transmitted signal compensated for propagation channel effects.
3. Outer receiver signal processing: channel decoding to retrieve the encoded audio data.
4. Audio decoder: Decoding the encoded audio data
5. Audio rendering delay: The delay in rendering the digital samples to the loudspeaker output. This is also a well-known and need not be accounted for.

FIG. 1 shows a prior art channel estimator 100 for a radio receiver that uses Wiener channel estimation in the signal processing. As shown, signal 101 is received at the channel estimator 100 from a fast Fourier Transform unit (not shown). Channel estimator 100 includes a two-dimensional (2D) Wiener filter that is split into two independent components, a time direction one-dimensional (1D) filter 102, and a frequency direction one-dimensional (1D) filter 104. Time and frequency direction filter coefficients are calculated by Wiener estimation at 106 and 108 respectively.

The channel estimation is based on interpolation by fixed length adaptive Wiener-filtering in the time and frequency directions. Calculation of Wiener filters for both directions (time and frequency) uses a Minimum Mean Square Error (MMSE) solution:

$$h = R_{hp} \cdot R_{pp}^{-1} \cdot p$$

$$R_{pp} = R_{pp} + \frac{1}{SNR} I$$

Where:
h is the optimal filter coefficients,
p—is the gain reference estimates as extracted from the received signal,
$R_{hp}$—is the cross-correlation matrix between h and p,
$R_{pp}$—is the auto-correlation matrix of p,
I—is the identity matrix of $R_{pp}$ size.
SNR—is estimated signal to noise ratio.
$R_{hp}$ and $R_{pp}$ are independently estimated for the time and frequency domains, and an auto-regressive fit (using a levinson durbin algorithm) is then performed to estimate the channel estimates both in the time domain 106 and then in frequency domain 108. Interpolation is done firstly in a time direction and secondly in a frequency direction to arrive at the channel estimates for a particular channel.

A two-dimensional Wiener channel estimator is an optimal solution, but this is complex. Here the filter length(s) of a time direction 1D filter and a frequency direction 1D filter are decided based on the transmission mode (A-D). The particular filer length of the Wiener filter metrics introduces a considerable delay in the signal processing. At present, the ETSI standard specifies 3.2 seconds for the TTA delay, of which the Wiener filter delay is a significant part.

It is desirable to have a radio receiver where the TTA can be lowered to meet the ETSI standard.

SUMMARY OF THE INVENTION

Examples of the present invention provide a method of signal processing, as described in the accompanying claims. Specific embodiments of the invention are set forth in the dependent claims. These and other aspects of the invention will be apparent from, and elucidated with reference to, the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION

The use of a 1D FAC channel estimation for initial decoding of the radio signals leads to an overall reduced TTA. To avoid any disadvantages that may arise from an initial 1D FAC channel estimation, 2D Wiener filter channel estimation is also run in parallel to ensure FAC channel estimation is completed, even if the 1D channel estimation is unsuccessful. Generally, the 1D filter will complete the filtering of the FAC channel of the received signal before the parallel 2D Weiner filter channel estimation of the FAC channel, as the 2D channel estimation has an increased processing time. Using 1D estimation for the FAC channel, reduces the time for FAC processing (when compared to 2D channel estimation) and this leads to a reduction in the overall TTA.

Figure 2:
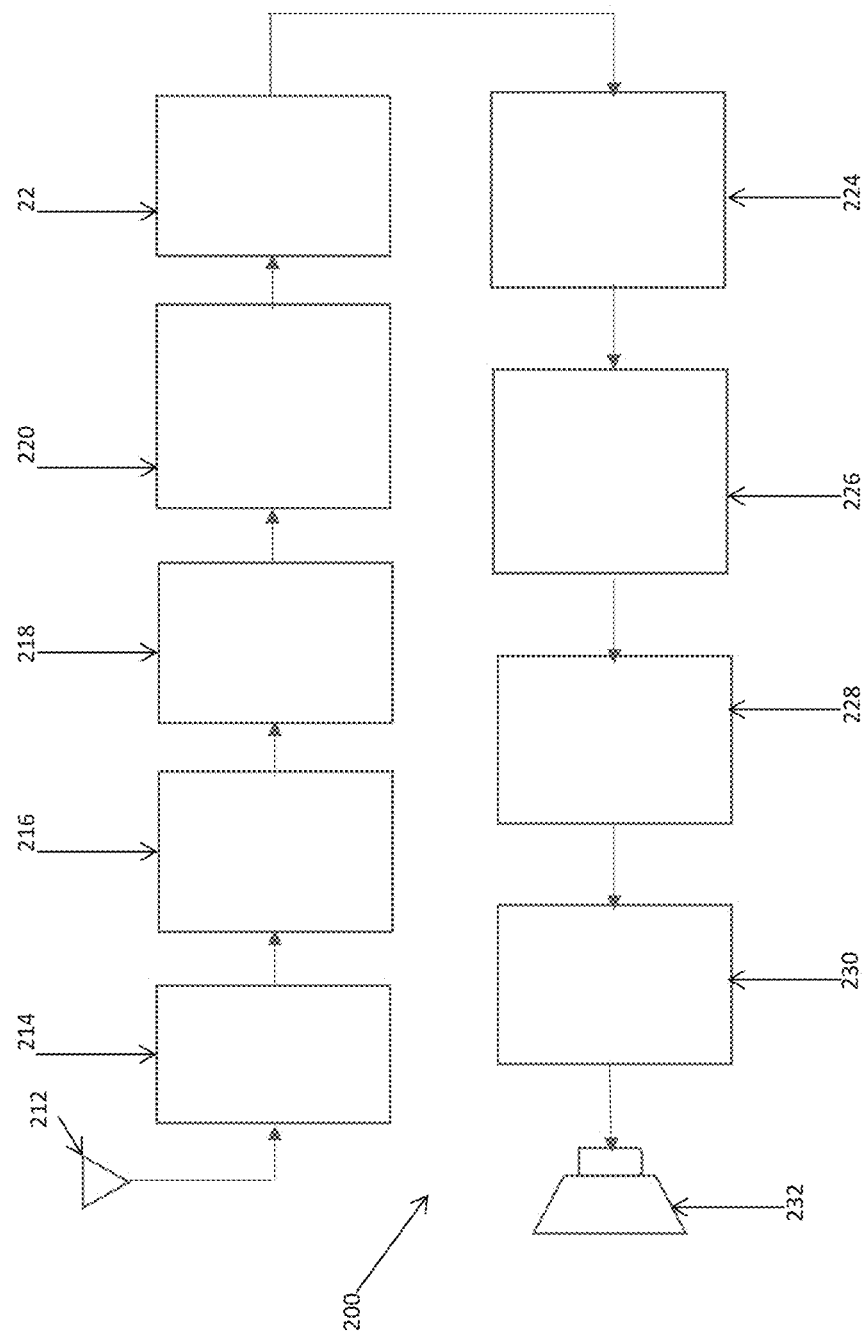
FIG. 2 illustrates an example of a radio receiver adapted in accordance with examples of the invention.

FIG. 2 shows a block diagram of a radio receiver 200 that has been adapted to Incorporate an improved channel estimator of the invention. A radio signal is received at antenna 212, and passed to tuner 214 for tuning to a preferred broadcast station, down converting the received signal to baseband frequency and delivering the signal to a signal processing unit. A signal processing unit is the data processing engine that processes the output data from tuner 214 and multiplexes the transmission on various different data streams. The signal processing unit consists of a signal detector 216, frame timing detector 218, frequency estimation and correction unit 220. Fast Fourier Transform (FFT) processing unit 222, channel estimator 224, equalizer 226, de-mapper and channel decoder 228, audio decoder 230 and speaker 232. The radio receiver may also include display means (not shown) to display information relating to the audio signal, signal or any other information decoded from the transmission data like traffic updates In operation, the signal detector 216 will detect the presence of a valid digital radio signal from the tuner 214 (if a valid signal is not detected at tuner 214 then no further signal processing occurs). When the signal detector 216 has detected a valid signal, then the timing and frequency of the detected signal generally has to be corrected so that the radio receiver 200 can properly decode the received signals. Frame timing detector 218 receives the signal from detector 216 and locks the timing transmission of the signal. Frequency estimation and correction unit 220 will lock on to the frequency of the received signal.

The frame timing detector 218, and frequency estimation and correction unit 220, typically operate using correlation based algorithms. The Frame timing detector 218 identifies the start of a frame by correlating the guard interval of the OFDM symbol with the useful part of the symbol across the frame and searching for the maximum correlation. The frequency estimation and correction will be based on a correlation between vectors with known phases of time reference and gain reference carriers with all carriers in symbol in frequency domain over frame. This estimated frequency offset is then compensated.

After the frequency estimation and correction, the signal passes through FFT processor unit 222 and then on to channel estimator 224. The channel estimator 224 will sequentially estimate the channel gains for each of the three logical channels: FAC, SDC and MSC—that is the factors of channel propagation strength along with the respective propagation delay for each channel. Typically the channel estimation stage is the longest for the FAC channel.

Equalizer 226 receives the output from the channel estimator 224 and equalizes the received signal—the data at the output of the equalizer is typically devoid of any channel propagation effects. The equalized data is then processed at de-muitiplexer and channel decoder unit 228. This processing stage allows the receiver 200 to derive the control information provided on the FAC and the SDC, and thereafter using this control information the payload data sent on the MSC is made available. The MSC data is an encoded bit stream, which is decoded by the source decoder (audio decoder 230) to give out digital samples that form the audio output of the speaker 232.

Figure 3:
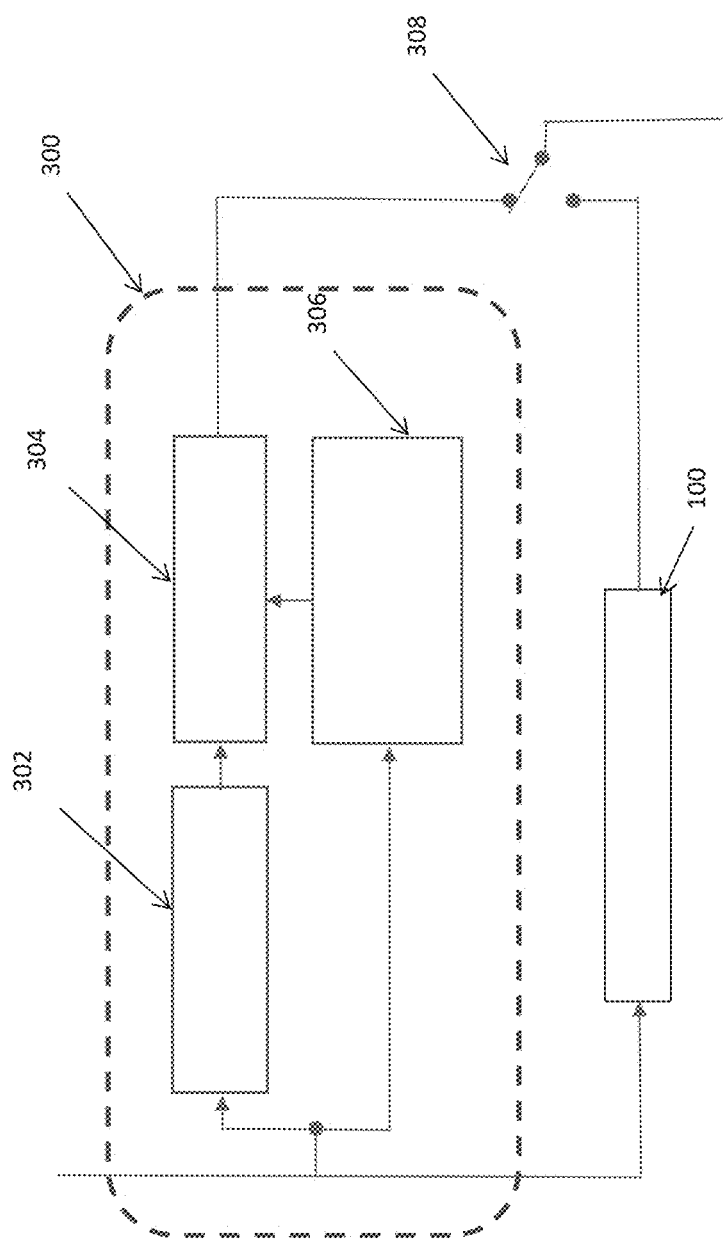
FIG. 3 illustrates a channel estimator for use in some examples of the invention.

FIG. 3 shows one example of an improved channel estimator 300 adapted according to example embodiments of this invention. Channel estimator 300 will perform the interpolation across the frequency direction for FAC decoding, and the frequency domain interpolation length will depend on mode of DRM transmission A, B, C, D. The FAC has to be estimated and decoded first, as information from this channel is needed for the estimation and decoding of the SDC and the MSC.

The channel estimator 300 performs channel estimation based on gain references—these are referred to as pilots. Once the initial channel estimation has been performed, channel estimates also have to be provided at the locations for which there are no pilots, and so interpolation of the channel estimates is done to get an estimate of the channel at all the positions. 2D channel estimation is highly complex and requires high levels of computation. To reduce this, the 2D channel estimation can be approximated as two separate one-dimensional channel estimations; where a 1D channel estimation is done in the time domain, followed by 1D channel estimation in frequency or vice versa.

In an example of this invention, 1D channel estimator 300 and 2D channel estimator 100 are estimating the FAC channel in parallel. Typically, the 1D channel estimator will provide the channel estimation quicker than the standard 2D estimator 100. Initially, switch 308 will be in the position to select output from 1D channel estimator 300. If the 1D channel estimation of the FAC is unsuccessful (as checked by standard Cyclic Redundancy Check CRC techniques); the switch 308 will then select the FAC output from 2D channel estimator 100

Channel estimator 300 can be separated into two 1D filters, time domain filter 302, and frequency domain filter 304. The 1D interpolation filters are arrived at by minimizing the mean square error (MMSE). In an example of the invention, the filter is preferably a Wiener filter, but other filters may also be used that perform filtering based on, say, least square analysis, correlation techniques or other statistical methods.

A 1 tap filter coefficient is used in the time domain-302 thus no interpolation occurs in the time domain 302 in channel estimator 300. Effectively, the 1tap filter coefficient is a known parameter used in the FAC estimation, and no calculations are required for this.

For a particular transmission mode, the filter delay will be half of the number of filter taps. For the 2D filtering, the delay is half of the product of the number of filter taps in the time domain with that of frequency domain.

In an example, for Mode A of a DRM transmission:
No of taps in time direction=4
No of taps in frequency direction=10
So total delay=(4*10)/2=20
total delay in time=20 symbols=20*26.66 ms=533 msec The above illustration is for FAC estimation using 2D channel estimator 100 and so the total delay in FAC channel estimation is 533 ms Using channel estimator 300, the time direction filter is a 1 tap filter coefficient 302 (effectively a set parameter) and so Wiener estimation is only used in the frequency direction 306 to calculate the filter coefficients. This is illustrated in the example below:
With 1 tap
No of taps in time direction=1
No of taps in frequency direction=10
So total delay=1*10/2=5
total delay in time=5*26.66=133 msec
So net savings=(533−133)=400 msec As shown, using channel estimator 300, can reduce the time for estimating the FAC channel by 400 ms.

Signal processing will occur in the channel estimator, the equaliser and then the decoder, and the interpolation is for the FAC, SDC and MSC.

Channel estimates (which are the filter coefficients of the time direction 1D filter and frequency direction 1D filter) are arrived at by minimising the mean square error [MMSE]-more commonly known as Wiener filtering.

Figure 1:
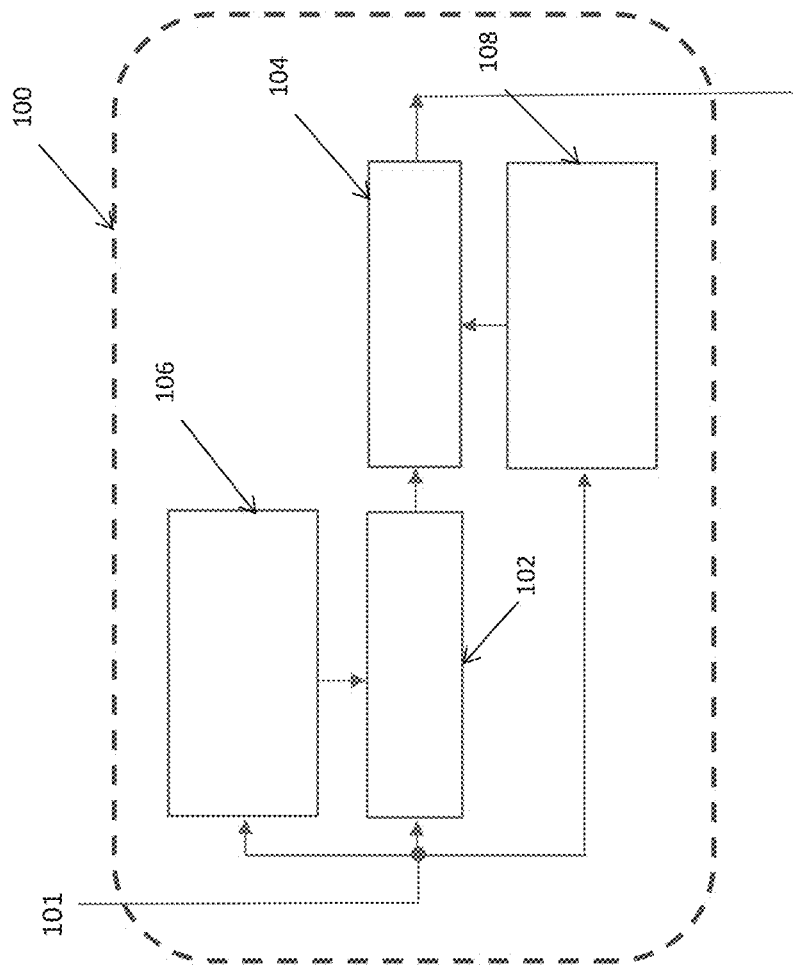
FIG. 1 illustrates a prior art channel estimator for use in a radio receiver.

In channel estimator 300 the 1D frequency direction filter 304 alone will be sufficient to decode the FAC—proceeding in this fashion will save around 300-400 ms on the overall channel estimation time when compared to signal processing using the standard channel estimator 100 as shown in FIG. 1. The 1D frequency direction filter coefficients are calculated at 306 by Wiener estimation.

Subsequent signal processing includes the sequential SDC and MSC equalization and decoding, as shown in FIG. 2.

Figure 4:
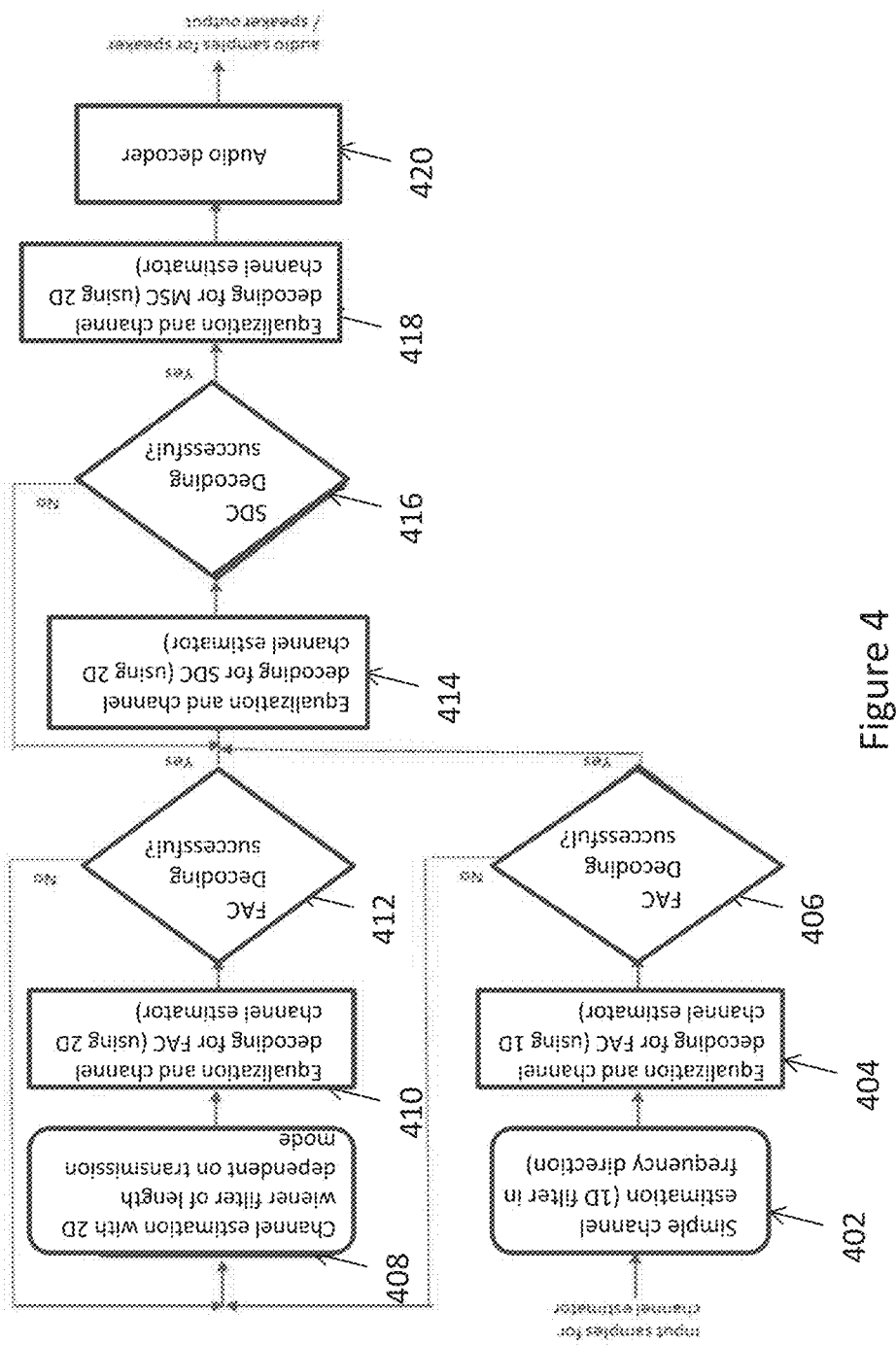
FIG. 4 is an example flow chart of a method of processing an audio signal for output.

FIG. 4 shows the various operations involved in the overall signal processing 400, that take place in the channel estimators of FIGS. 2 and 3. As shown, the channel estimator 300 will process the FAC input (to provide an initial, fast determination of the services available with the current radio station) using 1D channel estimation, then 2D channel estimator 100 will process the SDC input (to provide more details about the services) and subsequently the MSC input.

At 402 the signal is received from the FFT processing unit 222 and a 1D frequency direction FAC channel estimation is carried out on the input signal using channel estimator 300. 1D channel estimation reduces the time for the FAC channel estimation (and hence overall TTA) when compared to 2D FAC channel estimation, whilst still providing an acceptable decoded FAC. After the FAC channel estimation, equalization and decoding of the FAC is performed. 406 checks if the FAC decoding in 404 was successful-typically using CRC techniques. If the decoding was successful then the processing proceeds onwards to 414 with no further processing of the FAC. Successful 1D channel estimation for the FAC means that 2D channel estimation for the FAC does not have to be performed, and the signal processing can proceed directly to 2D channel estimation of the SDC and MSC However, if the check of the FAC decoding shows it was unsuccessful at 406 then standard 2D Weiner channel estimation for the FAC will take place at 408-412. This means that there is no decrease in the time for the overall signal processing. At 408 a 2D Weiner channel estimation is performed, taking account of the transmission mode. The output from here passes to 410 for equalization and channel decoding using a 2D channel estimator. The FAC decoding is checked at 412. If the decoding is successful the method proceeds to 414, otherwise the method repeats 408-412 until the FAC decoding is successful.

At 414 equalization and channel decoding for SDC is performed using a 2D channel estimator. At 416 checks if the SDC decoding was successful, if yes then the method passes to 418, otherwise 414 is repeated until the SDC decoding is successful. When the SDC decoding is successful, the output then passes to 418 for MSc channel equalization and decoding, again using a 2D channel estimator. At 420 the signal is received at the audio decoder (such as audio decoder 230 of FIG. 2), and the output of the stage is a signal that can be transmitted to a speaker or other output such as display means.

In some examples of the invention, the signal processing at 408-418 occurs in a 2D wiener filter that is provided parallel to the 1D wiener filter, used in 402-406. In this case, if the 1D filter based channel estimate do not successfully decode the FAC, the signal passes to the 2D wiener filter-based channel estimator for FAC decoding. Generally, in this technical area channel estimation using 2D Wiener filters is the optimal method. However, other signal processing and 2D filtering techniques such as least squares, correlation based, and other statistical methods may be possible for channel estimation The remaining components of the signal processor, such as the SDC decoding unit 116, MSC decoding unit 118, etc. will perform in their standard mode of operation. These may be implemented as a logic circuit, in a FPGA (field-programmable gate array) or in an algorithm.

The use of a 1D channel estimation filter for initial FAC decoding leads to an overall reduced TTA. The use of the 1D filter doesn't bring any disadvantages, as the 1D filter is run in parallel with the regular 2D wiener filter—and the 2D wiener filter has an output delay, before which the 1D filter and its accompanying mechanisms will finish with its first FAC decoding attempt.

The above method has been shown to achieve a TTA value better than the presently specified value for the ETSI standard. The current specified standard value is 3.2 seconds and the technique described above reduced this down to 3.0 seconds.

It is envisaged that the concept herein described may by used in the following areas: the automotive industry, especially for radio and audio entertainment solution of cars, as well as other areas such as hard disk drives, radar, robotics, mobile communications, vehicle to vehicle communications, satellite communications, general computing etc.

The channel estimation method as outlined in FIG. 4, using the channel estimator of FIG. 3 has only a small increase in MIPS (Million Instructions per Second) and memory footprint when compared to existing solutions for signal processing. This method also allows the filter complexity to be greatly-reduced. As mentioned previously, DRM has four transmission modes, A, B, C and D. The change in MIPS for each mode using this invention is as follows Mode A [4×10+1×10] versus 4×10;
Mode B [6×10+1×10] vs 6×10;
Mode C [10×10+1×10] versus 10×10; and
Mode D is (10×10+1×10) versus (10×10).

Hence, in the worst case, Mode D has a net increase of 10%.

This highlights that the increase in MIPS when this method is used is minimal and can effectively be ignored. In other words, incorporating this technique into signal processing does not increase the computational load significantly.

Generally, the MIPS or processing time has increased by around 10% on using the proposed method. Note for Mode A the increase is by 25%, but MIPS or processing time is done for the highest computation load scenario—which is mode D in this case Although examples of the invention are described with reference to a DRM radio unit, it is envisaged that the concepts herein described are applicable to any system where Weiner filter-based estimation is used. Although examples of the invention are described with reference to a signal processor in a DRM radio unit, it is envisaged that, in other examples, the circuits and concepts herein described may be equally applied, in general, to signal processing systems. Furthermore, it is envisaged that examples of the invention are not limited to a DRM radio system as described, but that the concepts may find equal applicability in any audio, video, radar, or other communication/entertainment systems.

Examples of a first aspect of the present invention describe a method of signal processing to reduce delays in time for channel estimation comprising: receiving a signal at a signal processor; estimating a first channel from the received signal with a one-dimensional, 1D, frequency filter in a frequency domain to generate an interim output; decoding said interim output (406) to generate decoded interim output; estimating at least a second channel from the decoded interim output with a two-dimensional, 2D, filter to produce a final output.

In an example embodiment of the invention, the method further comprises estimating said first channel with a 2D filter in parallel with estimating said first channel with a 1D filter to generate said interim output.

In an example embodiment of the invention, if the estimating of said first channel by said 1D filter (300) is unsuccessful, using the channel estimation output of said 2D filter (100), as said interim output. Preferably, the success of said 1D channel estimation is checked using a Cyclic Redundancy Check, CRC.

In an example of the invention, said 2D filter estimates said second channel using filter coefficients in a time domain and a frequency domain.

In Further preferred example, the signal is a Digital Radio Mondiale DRM radio signal comprising two or more channels from a Fast Access Channel (FAC), a Service Description Channel (SDC) and a Main Service Channel (MSC).

Preferably in an example of the invention, the FAC signal is filtered with said 1D frequency filter in the frequency domain, and after said FAC channel has been filtered, channel estimation of said SDC and MSC is performed using a 2D filter. The filtering of the FAC, SDC and MSC may be performed sequentially.

Preferably, said 2D filter implements a 2D channel estimation technique. Further preferably said 2D channel estimation uses one of: a Least Square estimation, a mean square estimation or a minimum mean square estimation. Preferably, said minimum mean square estimation is a Wiener filter estimation.

In this manner, a signal processing apparatus is described. The apparatus preferably comprises a signal detector a one-dimensional (1D) channel estimator (224, 300) comprising a one-dimensional, 1D, frequency direction filter (304) for filtering a first channel of said signal in a frequency domain, in parallel with a two-dimensional, 2D channel estimator (100) for filtering said first channel in a time and frequency domain, said 1D and 2D channel estimators configured for receiving an input signal from the signal detector to produce an interim output after filtering, a switch (308) configured to switch between the output of said 1D and 2D channel estimator for said first channel, so said first channel interim output from can undergo further signal processing; an equalizer and/or decoder component (226, 228) connected to said switch for processing said interim output, a second two-dimensional, 2D channel estimator (100) connected to said equalizer/decoder and configured to estimate at least a second channel from the decoded interim output, and signal output unit (232) connected to said 2D filter to output a final signal from said 2D filer.

In an example of the invention, said first and second 2D channel estimators estimate said first and/or channel using filter coefficients in a time domain and a frequency domain.

Preferably, said 2D filter performs 2D channel estimation using one of Least Square estimation, mean square estimation or a Wiener filter for minimum mean square estimation.

Preferably, the apparatus is a radio receiver, more preferably a receiver for DRM radio.

Because the illustrated embodiments of the present invention may, for the most part, be implemented using electronic components and circuits known to those skilled in the art, details will not be explained in any greater extent than that considered necessary as illustrated below, for the understanding and appreciation of the underlying concepts of the present invention and in order not to obfuscate or distract from the teachings of the present invention.

In the foregoing specification, the invention has been described with reference to specific examples of embodiments of the invention. It will, however, be evident that various modifications and changes may be made therein without departing from the scope of the invention as set forth in the appended claims and that the claims are not limited to the specific examples described above.

Those skilled in the art will recognize that the architectures depicted herein are merely exemplary, and that in fact many other architectures can be implemented which achieve the same functionality. Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected,' or 'operably coupled,' to each other to achieve the desired functionality.

Furthermore, those skilled in the art will recognize that boundaries between the above described operations merely illustrative. The multiple operations may be combined into a single operation, a single operation may be distributed to additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the circuit and/or component examples may be implemented as any number of separate integrated circuits or separate devices interconnected with each other in a suitable manner. Also for example, the examples, or portions thereof, may implemented as soft or code representations of physical circuitry or of logical representations convertible into physical circuitry, such as in a hardware description language of any appropriate type. Also, the invention is not limited to physical devices or units implemented in non-programmable hardware but can also be applied in programmable devices or units able to perform the desired sampling error and compensation by operating in accordance with suitable program code, such as minicomputers, personal computers, notepads, personal digital assistants, electronic games, automotive and other embedded systems, cell phones and various other wireless devices, commonly denoted in this application as 'embedded systems'. However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an,' as used herein, are defined as one, or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an.' The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A method of signal processing to reduce delays in time for channel estimation comprising:
receiving a signal at a signal processor;
estimating a first channel from the received signal with a one-dimensional, 1D, frequency filter in a frequency domain to generate an interim output;
decoding said interim output to generate decoded interim output;
estimating at least a second channel from the decoded interim output with a two-dimensional, 2D, filter to produce a final output.

2. The method of claim 1 further comprising estimating said first channel with a 2D filter in parallel with estimating said first channel with a 1D filter, to generate said interim output.

3. The method of claim 2 wherein if the estimating of said first channel by said 1D filter is unsuccessful, using the channel estimation output of said 2D filter, as said interim output.

4. The method of claim 3 wherein the success of said 1D channel estimation is checked using a Cyclic Redundancy Check, CRC.

5. The method of claim 1 wherein said 2D filter estimates said second channel using filter coefficients in a time domain and a frequency domain.

6. The method of claim 1 wherein said signal is a Digital Radio Mondiale, DRM, signal comprising two or more channels from a group including: a Fast Access Channel, FAC, a Service Description Channel, SDC, and a Main Service Channel, MSC.

7. The method of claim 6 wherein said 1D frequency filtering is performed on the FAC of said signal.

8. The method of claim 6, wherein at least one of said SDC and said MSC is a second channel filtered using said 2D filter.

9. The method of claim 8 wherein said SDC and said MSC are filtered sequentially by said 2D filter.

10. A broadcast radio receiver comprising:
a signal detector;
a one-dimensional (1D) channel estimator comprising a one-dimensional, 1D, frequency direction filter for filtering a first channel of said signal in a frequency domain, in parallel with a two-dimensional, 2D channel estimator for filtering said first channel in a time and frequency domain, said 1D and 2D channel estimators configured for receiving an input signal from the signal detector to produce an interim output after filtering,
a switch configured to switch between the output of said 1D and 2D channel estimator for said first channel, so said first channel interim output from can undergo further signal processing;
an equalizer and/or decoder component connected to said switch for processing said interim output,
a second two-dimensional, 2D channel estimator connected to said equalizer/decoder and configured to estimate at least a second channel from the decoded interim output,
and signal output unit connected to said 2D filter to output a final signal from said 2D filter.

11. The broadcast radio receiver of claim 10 wherein said first and second 2D channel estimators estimate said first and/or channel using filter coefficients in a time domain and a frequency domain.

12. The broadcast radio receiver of claim 10 wherein said 2D channel estimator performs 2D channel estimation using one of: Least Square estimation, mean square estimation, a Wiener filter for minimum mean square estimation.

13. The broadcast radio receiver of claim 10 wherein said radio receiver is a receiver adapted to operate in a Digital Radio Mondiale, DRM, radio.

* * * * *